United States Patent [19]

Inagaki

[11] Patent Number: 4,865,857

[45] Date of Patent: Sep. 12, 1989

[54] STERLIZING METHOD FOR TREATMENT OF FRESH FRUITS

[76] Inventor: Jitsuo Inagaki, 71, Aza Kamiyashiki, Oaza Itsusiki, Itsusikicho, Hazugun, Aichi, Japan

[21] Appl. No.: 214,531

[22] Filed: Jul. 1, 1988

[51] Int. Cl.$^4$ ................................................ A23L 3/16
[52] U.S. Cl. .................................. 426/241; 426/511; 426/521
[58] Field of Search ................ 426/241, 237, 511, 521

[56] References Cited

FOREIGN PATENT DOCUMENTS 60-217880 10/1985 Japan .................................... 426/241

Primary Examiner—George Yeung
Attorney, Agent, or Firm—Hanson & Associates

[57] ABSTRACT

A sterilizing method for treatment of fresh fruits and an apparatus used for the method that allow a significant reduction of steam consumption and of fruit sterilization cost is disclosed. The present invention is characterized by that extermination of vermin eggs and sterilization and disinfection of fresh fruits is conducted without deteriorating the freshness of the fruits to be treated by irradiating far infrared rays on the fruits to preheat the cores of the fruits to a predetermined temperature and then by maintaining the fruit cores at a predetermined temperature for a predetermined period of time in saturated steam.

6 Claims, 3 Drawing Sheets

STERILIZING METHOD FOR TREATMENT OF FRESH FRUITS

BACKGROUND OF THE INVENTION

This invention relates generally to a sterilizing method for treatment of fresh fruits and an apparatus used for the method.

Conventionally, fresh fruits produced in tropical areas are either sterilized in saturated steam heat-treatment facilities by heating. For example in the case of mangoes, the fruits are heated at a temperature higher than 46.0° C. for 10 minutes so that the cores of the fruits are kept at 46° C. or are treated in fumigation facilities by fumigating the fruits with ethylene dibromide or other fumigation agents at a temperature higher than 26° C. for 2 hours.

While the first sterilizing method using saturated steam has the disadvantage of a high treatment cost since it consumes a large quantity of saturated steam for treatment, the second sterilizing method using ethylene dibromide or other fumigation agents is accompanied by the problem of health hazards in that such fumigation agents are highly toxic.

Apart from these methods, recently attention has been paid to far infrared rays that are on the long wave length side of the infrared spectrum since irradiation of such rays on an object causes resonance-absorption in the object, a phenomenon in which the object absorbs energy from the projected far infrared rays and heats itself from the inside when it contains molecules having inherent frequencies that coincide with those of the projected rays to effect resonance. This phenomenon is of particular interest in terms of heating with low energy consumption.

SUMMARY OF THE INVENTION

It is therefore an object of the present invention to provide a sterilizing method for treatment of fresh fruits and an apparatus used for the method that can significantly reduce consumption of saturated steam and hence the cost of sterilization.

It is another object of the present invention to provide a sterilizing method for treatment of fresh fruits and an apparatus used for the method that can heat fruit cores to a desired temperature without heating flesh portions of fruits higher than the core temperature so as to to sterilize and disinfect fresh fruits and to exterminate vermin eggs without losing freshness of the fruits.

Other objects and advantages of the present invention will become evident in the course of the following description which is made with reference to the accompanied drawings.

DETAILED DESCRIPTION OF THE INVENTION

The inventor of the present invention has recognized that, when a far infrared ray irradiation technique is used for sterilization of fruits, the fruits are free from any adverse effects such as hardening of rinds that can occur when fruits are heated from the outside. These adverse effects are avoided because the fruit temperature starts rising from inside and hence an accurate temperature control of fruit sterilization can be realized through direct temperature control of far infrared radiation heaters. The conventional fruit sterilization method using saturated steam is accompanied by a high sterilizing cost because fruit cores should be heated up to 46° C. from outside. In contrast, a sterilizing apparatus using the far infrared ray irradiation technique requires a relatively small space for installation and hence a relatively low installation cost. The sterilizing method according to the present invention is characterized by the fact that fruit cores are heated to a temperature of 46° C. by irradiation by far innfrared rays resulting in reduction of energy consumption and maintenance of the freshness of the treated fruits.

More specifically, the sterilizing method for treatment of fresh fruits according to the present invention is characterized by extermination of vermin eggs and by sterilization and disinfection of fresh fruits being conducted without deteriorating the freshness of the fruits by irradiating far infrared rays on the fruits so as to preheat the cores of the fruits to a predetermined temperature and then by maintaining the fruit cores at a predetermined temperature for a predetermined period of time in saturated steam.

The apparatus for the sterilizing of fresh fruits according to the present invention is characterized by said apparatus comprising a cylindrical far infrared irradiation chamber having a curved heat radiation surface for irradiating fruits, a saturated steam chamber for maintaining the far infrared ray irradiated fruits at a predetermined temperature for a predetermined period of time, a mechanism for reducing pressure of said steam chamber, a nozzle for introducing steam into said steam chamber and means for controlling steam jet by automatically opening the nozzle when the temperature of said steam chamber has fallen under a predetermined level or when the pressure of the chamber has fallen under the saturated steam pressure.

Now an embodiment of the present invention will be described with reference to the accompanying drawings.

Figure 1:
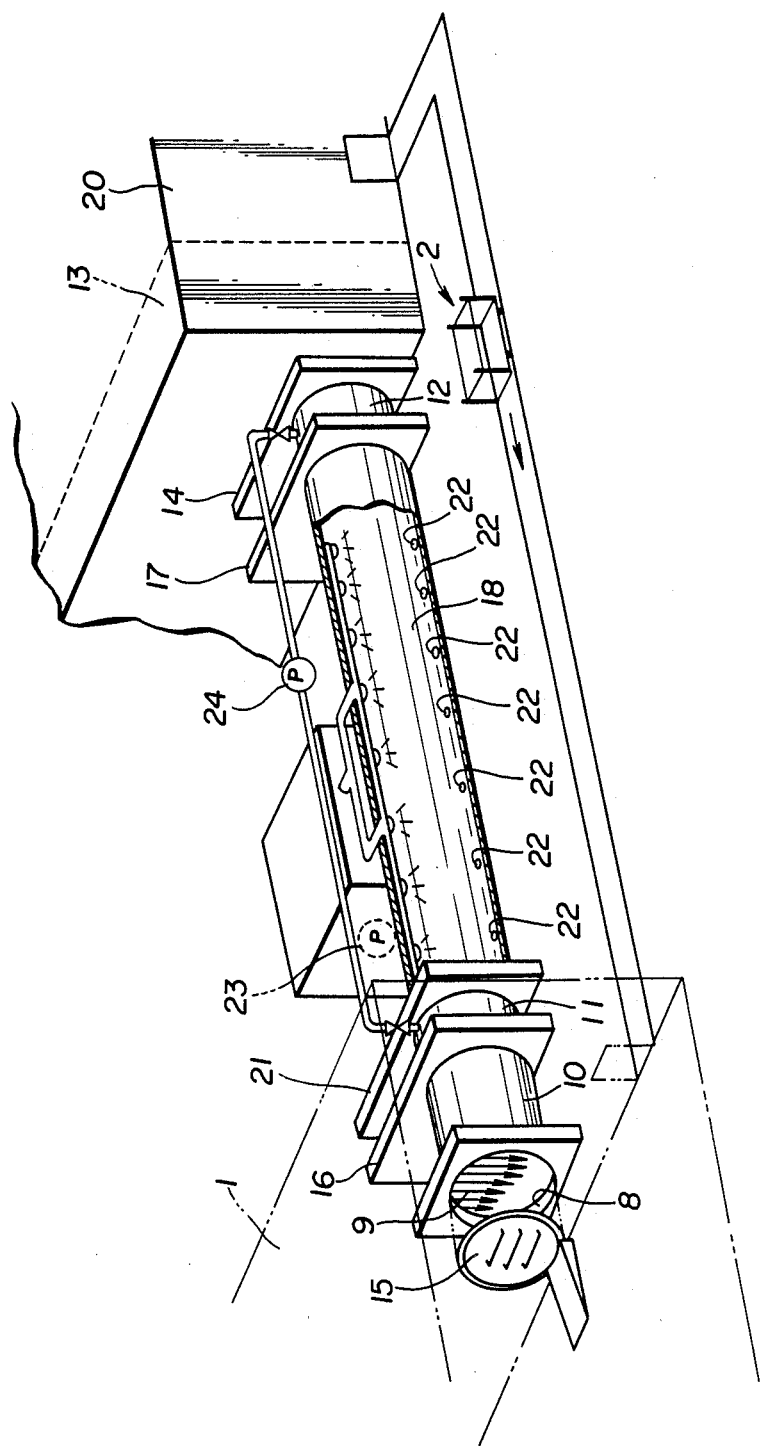
FIG. 1 is a perspective view of a fresh fruit sterilizing apparatus according to the present invention.

In FIG. 1, reference numeral 1 denotes an operation chamber for loading conveyor cart 2 with mangoes, where loading operations for mangoes are carried out.

Figure 2:
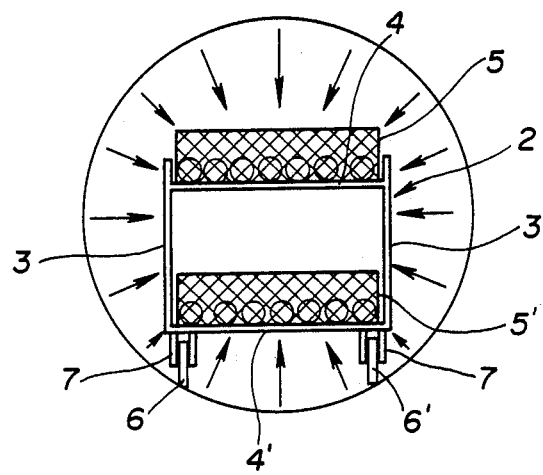
FIG. 2 is a sectional side view of the apparatus of FIG. 1 according to the present invention illustrating treatment of fresh fruits within it.

As is best shown in FIG. 2, conveyor cart 2 is formed with four vertical pillars 3, two rectangular frames 4 and 4' perpendicularly connected to said pillars rectangular metal basket 5 and 5' supported respectively by frames 4 and 4 and four wheels 7 fitted to the respective bottoms of pillars 3.

Turning back to FIG. 1, when metal baskets 5 and 5' of conveyor cart 2 are filled with mangoes, first door 15 is opened and cart 2 is moved out of operation chamber 1 into the cylindrical treatment area including preheating preparatory chamber 8. Conveyor cart 2 is automatically moved and halted by electric means on rails 6 and 6' in the cylindrical treatment area (see FIG. 2).

Conveyor cart 2 which is moved into preheating preparatory chamber 8 is then, after a predetermined period of time, moved through air curtain 9 into far infrared radiation chamber 10. Immediately thereafter, first door 15 is opened and the following conveyor cart 2 is sent into preheating preparatory chamber 8.

Far infrared chamber 10 is formed in a cylindrical tunnel-like configuration, its inner surface being a heat radiation surface and being maintained at a predetermined temperature by means of an electronic control system. Such a design for the heat radiation surface affords not only an effective and concentrated irradiation of far infrared rays but also effective reflections of the irradiated far infrared rays at all areas of the surface so that the irradiation density is enhanced and the temperature of the cores of the fruits to be treated is effectively brought to a predetermined level in a short period of time. The temperature at which a fruit core is heated for sterilization is normally provided by the laws and regulations in every country and varies depending on the kind of fruit. As for mangoes, 46° C. is the temperature for sterilization specified by law in Japan.

After elapse of a predetermined period of time during which the cores of the fresh fruits are heated to a predetermined temperature, second door 16 is opened and first conveyor cart 2 is transfered into first air pressure adjustment chamber 11. At the same time fourth door 17 is opened and conveyor cart 2 in saturated steam treatment chamber 18 is moved into second air pressure adjustment chamber 12. At this stage, first air pressure adjustment chamber 11 has an air pressure of 1 atm, while second air adjustment chamber 12 and draft drying chamber 13 have an identical air pressure level. Then the steam containing air in first air pressure adjustment chamber 11 is partly sucked by pump 24 and the sucked air is sent to second air pressure adjustment chamber 12 in order to reduce the air pressure in first air pressure adjustment chamber 11 to the air pressure level of saturated steam treatment chamber 18 and raise the air pressure in second air pressure adjustment chamber 12 to the air pressure level of draft drying chamber 13. Thereafter, third door 21 is opened and conveyor cart 2 is introduced into saturated steam treatment chamber 18 while fifth door 14 is simultaneously opened and conveyor cart 2 in air pressure adjustment chamber 12 is introduced into draft drying chamber 13.

When fifth door 14 is closed, the steam containing air in second air pressure adjustment chamber 12 is partly transferred into first air pressure adjustment chamber 11 by means of pump 24 in order to raise the air pressure in first air pressure adjustment chamber 11 up to 1 atm and reduce the air pressure level of second air pressure adjustment chamber 12 down to that of saturated steam treatment chamber 18 so that second door 16 and fourth door 17 can be opened without causing any movement of air. Saturated steam treatment chamber 18 can accomodate up to 10 conveyor carts and is designed to send carts out at a rate of one every minute, which are replaced by newly arrived carts at a same rate. Therefore, every conveyor cart 2 stays in the saturated steam treatment chamber for 10 minutes, which can be modified to a required period of time depending on the kind of fruits to be treated.

The interior of the saturated steam treatment chamber is maintained at a temperature of 46° C. or slightly higher. In order to achieve a saturated steam condition, it is also adjusted to a predetermined reduced pressure which is compatible with the above described temperature by pump 23 which is connected with pressure reduction adjustment port 22.

The interior of the saturated steam treatment chamber is equipped with a temperature sensing tube and a steam pressure sensing tube, which automatically open the valve of the nozzle provided in said saturated steam treatment chamber to allow a jet of steam into it whenever a fall of either temperature or steam pressure below the predetermined level is sensed.

Draft drying chamber 13 is continuously ventilated with dry air that comes through a filter in order to dry the fruits on the conveyor cart contained in the chamber with air draft.

The dried fresh fruits are then conveyed into cooling-packaging chamber 20.

Cooling-packaging chamber 20 is kept in a cooled condition by means of a jet of liquidated nitrogen coming out of a nozzle provided in the chamber, whose inside atmosphere is maintained at a level slightly higher than 1 atm., 1.1 atm for example, in order to eliminate any outside air that can enter into the chamber.

Figure 4:
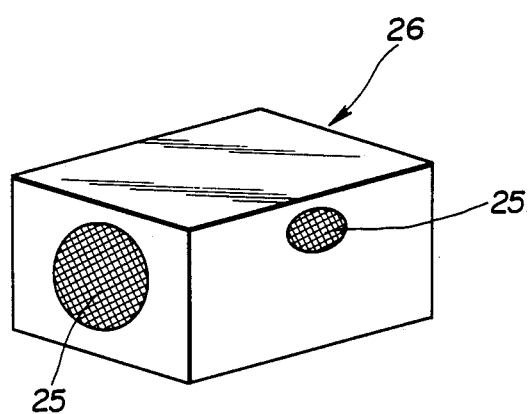
FIG. 4 is a perspective view of a container used for fruits that have been sterilized.

An air shower system is provided near the exit of cooling-packaging chamber 20 which bursts out a cascade of air from upward to downward. The fruits that have been sterilized and cooled are packed into containers 26 (see FIG. 4) having net covered openings 25 for control of insects and then carried away on cooling container vehicles. The air to be used for the air shower has been sterilized by ultraviolet rays. Conveyor cart 2 is automatically returned to loading operation chamber 1 after completion of a duty cycle.

It should be understood that said second to fifth doors are automatically closed each time after a conveyor cart 2 loaded with fresh fruits passes therethrough.

Figure 3:
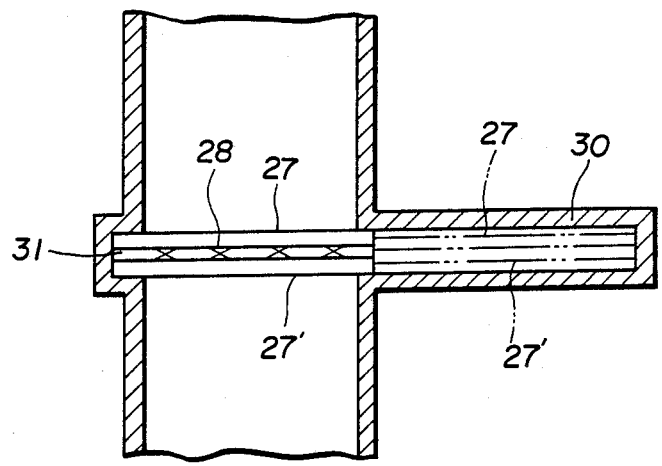
FIG. 3 is a partial sectional side view of the door used in the apparatus of FIG. 1 according to the present invention.

As is illustrated in FIG. 3, each of said second to fifth doors in the embodiment of the present invention as described above comprises a pair of juxtaposed door bodies 27 and 27' detachably connected with each other by a number of pairs of arms 28. When a cart passes, the door is slidingly retracted into door box 30 to take a opened position and then, after passage of the cart, automatically returns from door box 30 to the closed position where its front end abuts the bottom of groove 31 provided on the side wall of the pathway opposite to door box 30. Then the paired arms 28 are driven to stand up to form crosses so that door bodies 27 and 27' are pushed away from each other in order to sealingly close the path. A hydraulic system or other known means may be used for driving the doors. When a door is opened, paired arms 28 are brought to their respective sitting positions first in order to put door bodies 27 and 27' into close contact and then the door is retracted into door box 30.

As described above, a sterilizing method according to the present invention comprises a preheating step of fresh fruits by irradiating far infrared rays on the fruits so that the cores of the fruits can be heated to a desired temperature in a relatively short period of time with a relatively little consumption of energy. Moreover, since a sterilizing method according to the present invention simply maintains the preheated fruits in saturated steam at a temperature equal or nearly equal to that of the fruits for a required period of time, the energy of saturated steam is not consumed for heating the fruits and hence consumption of energy of saturated steam is practically limited to energy loss during the process, the energy consumption level being remarkably lowered in this method as compared to any existing fruit sterilizing method thereby significantly lowering the cost of fruit sterilization. Therefore, a method according to the present invention meets any energy saving and resource saving requirements of the present times. Furthermore, the sterilizing method according to the present invention allows heating of fruit cores to a predetermined temperature without heating fruit flesh up to the level and hence sterilization and disinfection of fruits and extermination of vermin eggs can be carried out without losing freshness of the treated fruits.

What is claimed is;

1. A sterilizing method for treatment fo fresh fruit for extermination of vermin eggs as well as sterilization and disinfection of fresh fruit without deteriorating the freshness of the fruit, the method comprising irradiating far infrared rays on the fruit to preheat the fruit to a predetermined temperature and then maintaining the core of the fruit at the predetermined temperature for a predetermined period of time in an environment of saturated steam.

2. A method according to claim 1 comprising irradiating the fruit in a far infrared irradiation chamber of a treatment apparatus, the irradiation chamber having far infrared irradiation generating means and a curved heat radiation surface.

3. A method according to claim 2 wherein after irradiating the fruit, the fruit core is maintained at the predetermined temperature in an environment of saturated steam in a steam chamber of the treatment apparatus, the steam chamber including a mechanism for reducing pressure of said steam chamber, a nozzle for introducing steam into said steam chamber in a steam jet and means for controlling said steam jet by automatically opening the nozzle when the temperature of the said steam chamber has fallen beneath a predetermined level or when the pressure of the steam chamber has fallen beneath saturated steam pressure.

4. A method according to claim 2 wherein, prior to irradiating the fruit in the far infrared irradiation chamber, the fruit is preheated in a preparatory chamber of the treatment apparatus.

5. A method according to claim 4 wherein, after the fruit is maintained in an environment of saturated steam, the fruit is dried in a draft drying chamber of the treatment apparatus which is ventilated with dry air.

6. A method according to claim 5 wherein, after the fruit is dried in the draft drying chamber, the fruit is cooled in a cooling chamber of the treatment apparatus.

* * * * *